United States Patent
Lim et al.

(10) Patent No.: US 7,450,782 B2
(45) Date of Patent: Nov. 11, 2008

(54) APPARATUS AND METHOD FOR IMPROVING THE QUALITY OF A PICTURE HAVING A HIGH ILLUMINATION DIFFERENCE

(75) Inventors: Chae-Whan Lim, Daegu (KR); Young-Sik Park, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 777 days.

(21) Appl. No.: 10/926,101

(22) Filed: Aug. 26, 2004

(65) Prior Publication Data
US 2005/0046708 A1 Mar. 3, 2005

(30) Foreign Application Priority Data
Aug. 29, 2003 (KR) .......... 10-2003-0060446

(51) Int. Cl.
G06K 9/36 (2006.01)
G06K 9/40 (2006.01)
(52) U.S. Cl. .......... 382/284; 382/261; 382/275
(58) Field of Classification Search .......... 382/284, 382/261, 274; 348/231.6
See application file for complete search history.

(56) References Cited

U.S. PATENT DOCUMENTS

| | | | | |
|---|---|---|---|---|
| 5,420,635 A | * | 5/1995 | Konishi et al. | 348/362 |
| 7,176,962 B2 | * | 2/2007 | Ejima | 348/208.4 |
| 7,176,975 B2 | * | 2/2007 | Matsunaga et al. | 348/345 |
| 7,193,652 B2 | * | 3/2007 | Hori et al. | 348/362 |
| 7,301,563 B1 | * | 11/2007 | Kakinuma et al. | 348/208.13 |
| 2004/0183940 A1 | * | 9/2004 | Raskar | 348/371 |
| 2004/0218830 A1 | * | 11/2004 | Kang et al. | 382/274 |

FOREIGN PATENT DOCUMENTS

| | | |
|---|---|---|
| JP | 08-331505 | 12/1996 |
| JP | 2003-158669 | 5/2003 |
| KR | 10-1996-0036800 | 10/1996 |
| KR | 10-2001-0036063 A | 5/2001 |

* cited by examiner

Primary Examiner—Duy M Dang
(74) Attorney, Agent, or Firm—Roylance, Abrams, Berdo & Goodman L.L.P.

(57) ABSTRACT

An apparatus and image reconstruction method for use in an apparatus including a digital camera are provided. The apparatus and method include driving an image sensor during a short exposure time in an image reconstruction mode, driving the image sensor during a relatively-long exposure time in the image reconstruction mode, and acquiring first and second frame images having different illumination degrees; assigning substantially identical image data of the first and second frame images to local images each having a predetermined size; calculating local variance values of image data of each of the local areas; comparing a local variance value of the first frame image with a local variance value of the second frame images, assigning a high weight to one local image having a high local variance value, and assigning a low weight to the other local image having a low local variance value; applying the determined weights to image data of individual local areas of the first and second frame images, performing image reconstruction, and displaying a reconstructed image.

16 Claims, 10 Drawing Sheets

APPARATUS AND METHOD FOR IMPROVING THE QUALITY OF A PICTURE HAVING A HIGH ILLUMINATION DIFFERENCE

PRIORITY

This application claims the benefit under 35 U.S.C. 119(a) of an application entitled "APPARATUS AND METHOD FOR IMPROVING QUALITY OF PICTURE HAVING HIGH ILLUMINATION DIFFERENCE", filed in the Korean Intellectual Property Office on Aug. 29, 2003 and assigned Serial No. 2003-60446, the entire contents of which are incorporated herein by reference.

BACKGROUND OF THE INVENTION

1. Field of the Invention

The present invention relates to an apparatus and method for improving picture quality. More particularly, the present invention relates to an apparatus and method for improving picture quality by synthesizing pictures having a high illumination difference.

2. Description of the Related Art

Recently, developers have conducted intensive research into a method for improving the quality of a picture or image captured by either a digital camera or a device having a digital camera module, resulting in the proposal of a variety of requisite devices, for example, a high-performance processor, a high-capacity memory for processing video or image data, and a controllable camera sensor, etc. Recently-manufactured digital cameras or devices each having a digital camera module have included the aforementioned requisite devices, resulting in a variety of results for improving the quality of a captured image or picture.

Many hybrid terminal devices each having a digital camera are currently being developed, such that the hybrid terminal devices are increasingly coming onto the market. A representative example of the hybrid terminal devices is a mobile phone (also called a hand-held device). The mobile phone has recently begun to include various functions. Particularly, an example of the current mobile phone is equipped with a camera, such that it can function as a digital camera or a camcorder. The mobile phone can basically capture a photo image simultaneously while performing a communication function. The most important thing for a user who takes a picture to know is how much the quality of a captured picture have improved since the introduction of mobile phones with digital cameras.

The digital cameras or the devices having such digital cameras use a variety of methods for improving the quality of a captured picture or image, and one representative example of the methods is a method for improving the quality of a picture or image having a high illumination difference. Typically, in the case of capturing a target object using a camera, exposure is controlled according to the peripheral illumination of the target object, such that controlled exposure is used. In this case, in case of adjusting the exposure to a target object having a low illumination, a background image having relatively-high illumination is saturated so that it is difficult to recognize the target object. Otherwise, in case of adjusting the exposure to the background image, an image of a target object having relatively-low illumination becomes too dark so that it is difficult to recognize the target object. Specifically, if an image is captured centering around a target object as shown in FIG. 1A, it is difficult to recognize a background image of the target object. Otherwise, if an image is captured centering around a background image of the target object, an image of the target object becomes too dark so that it is difficult to recognize the target object as shown in FIG. 1B. Therefore, if a captured image whose exposure is adjusted centering around the target object is synthesized with the other captured image whose exposure is adjusted centering around the background image under the aforementioned environment of a high illumination difference, and the synthesized result is properly processed, the best picture image having no lost image quality can be created in all the areas of the picture image.

SUMMARY OF THE INVENTION

Therefore, the present invention has been made in view of the above problems, and it is an object of the present invention to provide an apparatus and method for improving the quality of a picture having a high illumination difference in association with a target object of a digital camera.

It is another object of the present invention to provide an apparatus and method for improving a picture quality by synthesizing picture images having a high illumination difference from each other using a digital camera.

It is yet another object of the present invention to provide an apparatus and method for acquiring moving images having different illumination differences by generating different exposures of an image sensor of a digital camcorder, and synthesizing images having different illumination differences from the acquired moving images, such that image quality of the moving images can be improved.

In accordance with one aspect of the present invention, the above and other objects can be accomplished by the provision of an apparatus equipped with a camera. The apparatus comprises an image sensor for acquiring substantially identical images having different illumination degrees; a plurality of memories for storing the images generated from the image sensor; an image controller for dividing each of the images stored in the memories into a plurality of local images each having a predetermined size, calculating variance values of the local images, comparing the calculated local variance values therebetween, assigning a high weight to a local image having a high variance value, assigning a low weight to a local image having a low variance value, synthesizing the local images, and creating a reconstructed image; and a display for displaying the reconstructed image.

In accordance with another aspect of the present invention, there is provided an image processing apparatus for use in a mobile phone or hand-held phone. The apparatus comprises a communication module for performing a wireless communication function; a data processor for performing modulation/demodulation and coding/decoding functions of a signal transmitted/received by the communication module; a controller for processing the signal transmitted/received by the data processor in a communication mode, and generating an image-processing control signal in an image processing mode; a timing controller for generating at least two exposure control signals having different exposure times in the image processing mode; an image sensor for acquiring substantially identical images having different illumination degrees using the exposure control signals; an image processor for dividing each of the images acquired from the image sensor into a plurality of local images each having a predetermined size, calculating variance values of the local images, comparing the calculated local variance values therebetween, assigning a high weight to a local image having a high variance value, assigning a low weight to a local image having a low variance value, synthesizing the local images, and creating a reconstructed image; a plurality of memories for storing the images generated from the image sensor, and storing an image reconstructed by the image processor; and a display for displaying the acquired images and the reconstructed image.

In accordance with yet another aspect of the present invention, there is provided an image reconstruction method for use in an apparatus including a digital camera. The method comprises the steps of: acquiring/displaying substantially identical images having different illumination degrees; dividing each of the acquired images into a plurality of local images each having a predetermined size, and calculating local variance values of image data of the local images; comparing the calculated local variance values therebetween, assigning a high weight to a local image having a high local variance value, assigning a low weight to a local image having a low local variance value; applying the determined weights to image data of the local areas, performing image reconstruction, and displaying a reconstructed image.

In accordance with yet another aspect of the present invention, there is provided an image reconstruction method for use in an apparatus including a digital camera. The method comprises the steps of: driving an image sensor during a short exposure time in an image reconstruction mode, driving the image sensor during a relatively-long exposure time in the image reconstruction mode, and acquiring first and second frame images having different illumination degrees; assigning substantially identical image data of the first and second frame images to local images each having a predetermined size; calculating local variance values of image data of each of the local areas; comparing a local variance value of the first frame image with a local variance value of the second frame images, assigning a high weight to one local image having a high local variance value, and assigning a low weight to the other local image having a low local variance value; and applying the determined weights to image data of individual local areas of the first and second frame images, performing image reconstruction, and displaying a reconstructed image.

In accordance with yet another aspect of the present invention, there is provided a moving image display method for use in an apparatus including a digital camera. The method comprises the steps of: driving an image sensor during a first exposure time in an image reconstruction mode to acquire a first image, calculating a first local variance value of the first image, and storing the first local variance value; driving the image sensor during a second exposure time in the image reconstruction mode to acquire a second image, calculating a second local variance value of the second image, and storing the second local variance value; comparing the second local variance value of the second image with the first local variance value of the first image, assigning a high weight to one local image having a high local variance value, and assigning a low weight to the other local image having a low local variance value; and applying the determined weights to image data of a corresponding local area of the first and second images, performing one image reconstruction, and displaying a reconstructed image.

BRIEF DESCRIPTION OF THE DRAWINGS

The above and other objects, features and other advantages of the present invention will be more clearly understood from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Several embodiments of the present invention will now be described in detail with reference to the accompanying drawings. In the following description, a detailed description of known functions and configurations incorporated herein will be omitted for conciseness.

Figure 1A:
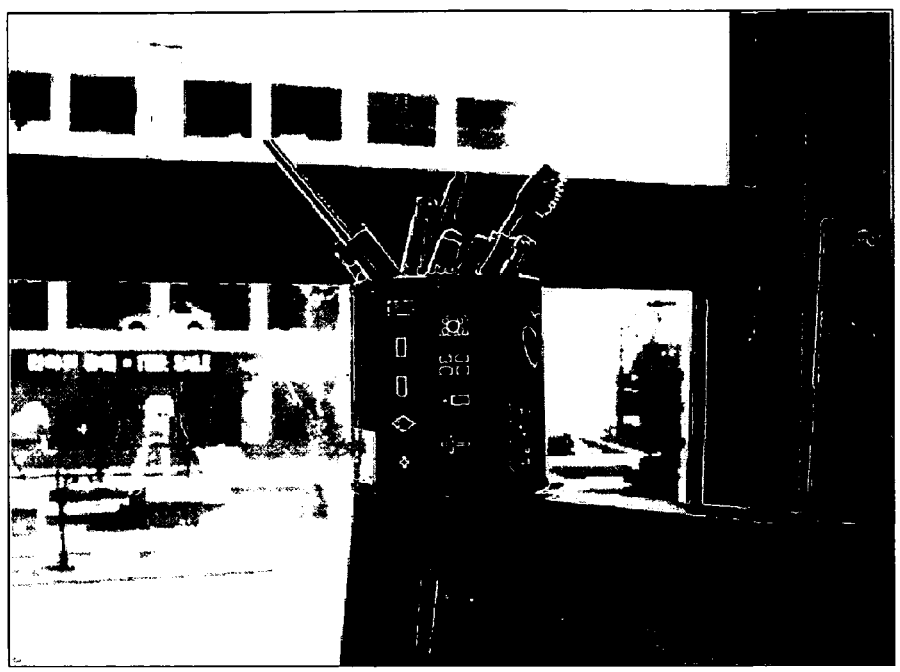
FIGS. 1A through 1B are a picture image captured at high illumination and the other picture image captured at low illumination.

A variety of products each equipped with a digital camera are currently arriving on the market, and a variety of methods for improving the quality of a picture image captured by a digital camera are increasingly being proposed and developed. The embodiments of the present invention capture two or more picture images having a high illumination difference from each other using such a digital camera, and reconstruct the picture images, resulting in improved quality of the picture images. Specifically, the embodiments of the present invention capture a first picture image centering around a target object and a second picture image centering around a background image by controlling an exposure time, and synthesizes the first and second picture images, such that it can reconstruct a resultant picture image in which a clear target object image and a clear background image are formed. If capturing an image in a high illumination difference, a background image having relatively-high illumination is saturated when adjusting an exposure to a target object having low illumination as shown in FIG. 1A, so that the digital camera has difficulty in recognizing the background image of the target object. Otherwise, if adjusting the exposure to the background image as shown in FIG. 1B, an image of a target object having relatively-low illumination becomes too dark so that the digital camera has difficulty in recognizing the target object.

In this case, if a captured image whose exposure is adjusted centering around the target object is synthesized with the other captured image whose exposure is adjusted centering around the background image, and the synthesized result is properly processed, the best picture image having no reduction in image quality can be created in all the areas of the picture image.

Figure 1B:

In order to reconstruct a desired image using a method of the present invention, two or more images having an illumination difference therebetween are needed as shown in FIGS. 1A through 1B.

Figure 2:
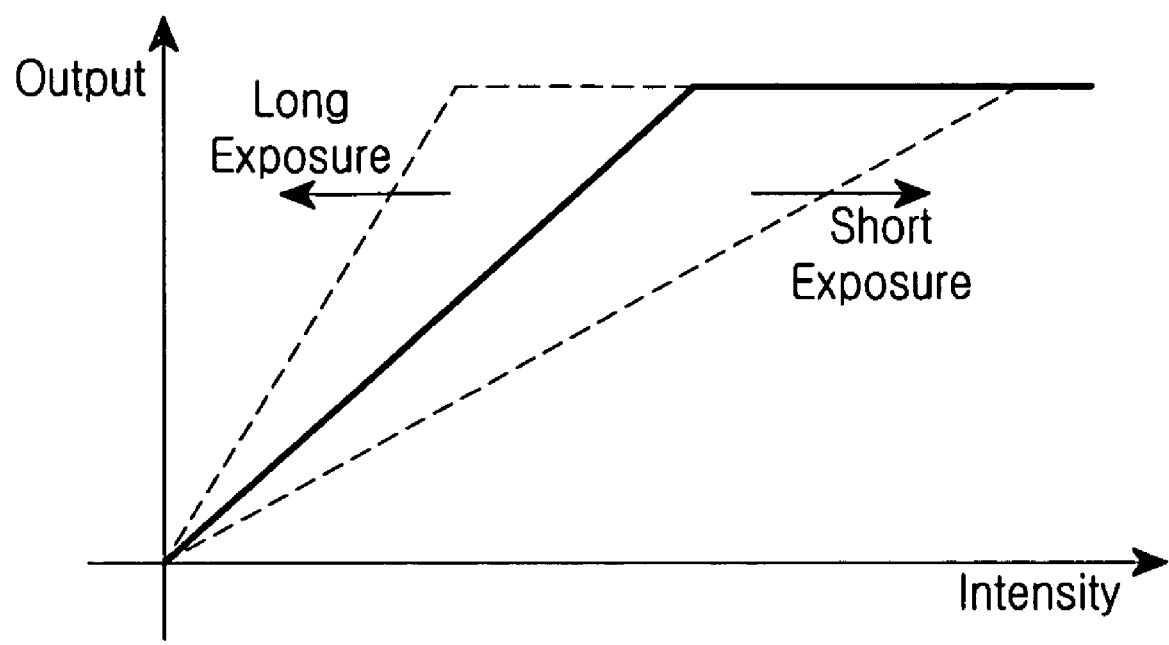
FIG. 2 is a graph illustrating the relationship between illumination and output data acquired by an image sensor when a picture image is captured.
Figure 3A:
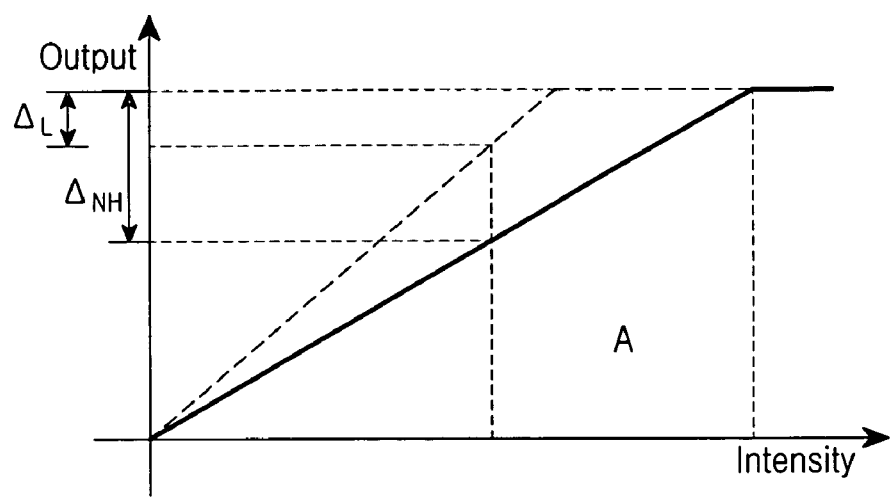
FIGS. 3A through 3B are a data distribution diagram in a high illumination area and a data distribution diagram in a low illumination area, respectively.
Figure 3B:
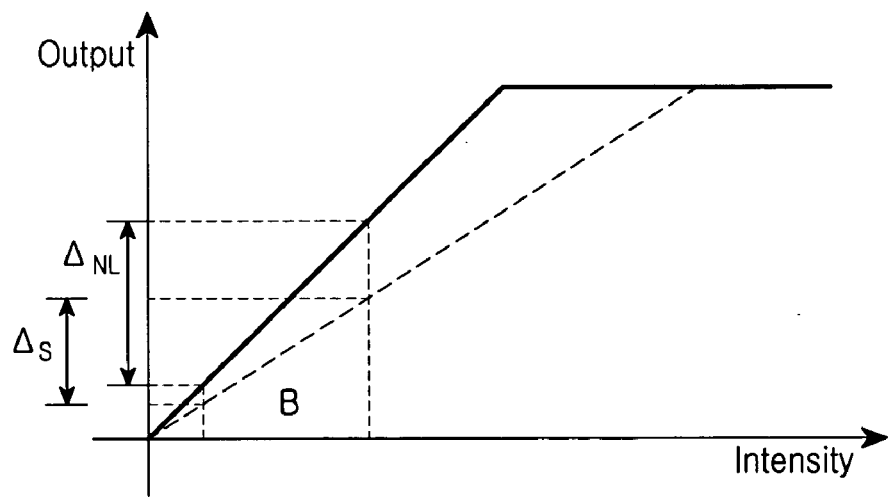

FIG. 2 is a graph illustrating the relationship between illumination and output data acquired by an image sensor when a picture image is captured. Specifically, FIG. 2 is a graph illustrating the relationship between intensity levels when a desired target object is captured and when output data is acquired by an image sensor. FIG. 3A shows characteristics of image data created when an exposure time is set to a long period of time. FIG. 3B shows characteristics of image data created when an exposure time is set to a short period of time.

Referring to FIGS. 2 through 3B, the relationship graph is changed based on an exposure time as shown in FIG. 2. The shorter the exposure time, the lower the slope. The longer the exposure time, the higher the slope. It can be seen that a specific position having high intensity in a specific exposure state is saturated. In this case, an output signal is determined to be a maximum value such that it becomes constant. An area of high illumination in captured image data will be distributed in the form of 'A' area of FIG. 3A, and an area of low illumination in the captured image data will be formed in the form of 'B' area of FIG. 3B.

An output signal of a specific area having an intensity distribution of the A area denoted by a solid line of FIG. 3A has an interval $\Delta_{NH}$. An output signal of another area having an intensity distribution of the A area denoted by dotted lines has an interval $\Delta_L$. Therefore, variance of the output signal denoted by a dotted-line graph is less than that of the other output signal denoted by the solid-line graph in FIG. 3A. An output signal of a specific area having an intensity distribution of the B area denoted by a solid line of FIG. 3B has an interval $\Delta_{NL}$. An output signal of another area having an intensity distribution of the B area denoted by dotted lines has an interval $\Delta_S$. Therefore, variance of the output signal denoted by a dotted-line graph is less than that of the other output signal denoted by the solid-line graph in FIG. 3B. That is, a high-illumination area of an image acquired by a long exposure time is saturated, such that a distribution range of pixel data is reduced, resulting in a reduced variance. A distribution range of pixel data of a low-illumination area of an image acquired by a short exposure time is reduced, resulting in a reduced variance.

Figure 4:
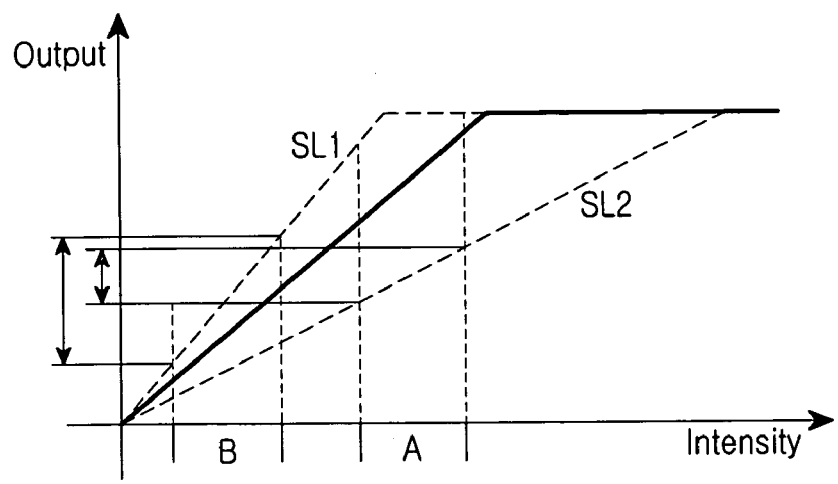
FIG. 4 is a graph illustrating the principle for reconstructing an image having characteristics of FIGS. 3A through 3B in accordance with an embodiment of the present invention.

FIG. 4 is a graph illustrating the principle for reconstructing at least two image data having an illumination difference from each other in accordance with an embodiment of the present invention.

As shown in FIG. 4, a first case having characteristics of the slope SL1 and a second case having the slope SL2 are depicted according to exposure, such that images having a high illumination difference from each other can be captured. In this case, a high-illumination area of the captured picture image desires to acquire an output signal of the slope SL2's characteristics, and a low-illumination area of the captured picture image desires to acquire an output signal of the slope SL1's characteristics. Therefore, a first local variance of an image acquired by the slope SL1's characteristics and a second local variance of an image acquired by the slope SL2's characteristics are calculated, a weight is applied to the bigger local variance between the first and second local variances, and an image reconstruction is performed, such that a desired picture image can be reconstructed.

The inventive apparatus for reconstructing images according to an embodiment of the present invention may be equipped with a digital camera. In this case, an image sensor of the digital camera selectively controls an exposure time during which a picture image is captured, reconstructs images captured by different exposure times, and therefore improves the quality of a picture image. For this operation, the inventive apparatus includes an image sensor for converting an image signal of a captured target object into an electrical signal, a display for displaying an image captured by the image sensor, a memory serving as a storage space for storing the captured image in the form of a data file, and a processor for controlling the above components, and processing input image data, etc.

Image sensors for use in either the digital camera or a device including the digital camera generate electric signals proportional to a quantity of light illuminated on their light-receiving parts, and Analog-to-Digital (AD)-convert the electric signals in such a way that they convert the electrical signals into digital data. A controller processes the digital data in the form of picture image data. In this case, each image sensor includes a readable/recordable register therein, and the controller writes a predetermined value in a register of the image sensor to control operations of the image sensor. Specifically, commercial image sensors include registers capable of controlling exposure, respectively, and exposure is selectively applied according to a value recorded on the register when a target image is captured in such a way that a desired image can be acquired.

A method for reconstructing an image having an improved quality caused by different exposures in the aforementioned digital camera or the device equipped with the digital camera must be acquired from an image having an illumination difference, such that two or more images are required.

Figure 5:
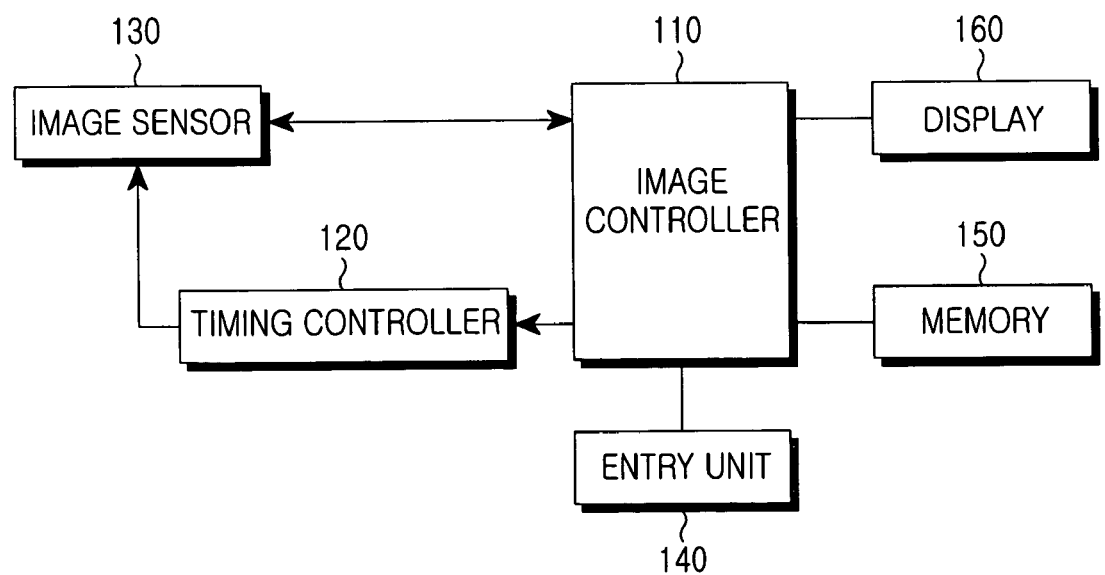
FIG. 5 is a block diagram illustrating an apparatus for improving the quality of pictures having a high illumination difference in accordance with an embodiment of the present invention.

FIG. 5 is a block diagram illustrating a digital camera for improving the quality of pictures having a high illumination difference from each other in accordance with a preferred embodiment of the present invention.

Referring to FIG. 5, an entry unit 140 generates key signals for controlling individual operations of a digital camera. In this case, the entry unit 140 processes at least two images having a high illumination difference therebetween, such that it generates a key command for improving the quality of the processed images. In this case, the key command may include a first key command for processing two or more still images having an illumination difference therebetween, and a second key command for processing individual images of a moving image captured at a predetermined illumination difference at frame intervals. The aforementioned key command may be implemented by installing an independent key in the entry unit 140, and may also be implemented in the form of a menu such that a user is able to click on the menu.

An image controller 110 controls overall operations of the digital camera, and controls a function for improving the quality of at least two images having a high illumination difference therebetween according to an embodiment of the present invention. Upon receiving a command from the entry unit 140, the image controller 110 generates a control signal for acquiring images having an illumination difference therebetween. Also, the image controller 110 processes images having a high illumination difference, such that it improves the quality of the images. It should be noted that the number of images having different illumination degrees must be higher than at least '2'. For the convenience of description, the embodiment of the present invention assumes an exemplary case in which two images having an illumination difference are acquired to improve a resultant image quality.

A timing controller 120 generates a timing control signal for controlling an exposure time of the image sensor 130 upon receiving a control signal from the image controller 110. In this case, the timing control signal generates a first exposure control signal for setting a short exposure time and a second exposure control signal for setting a long exposure time. If the image controller 110 commands a timing control operation of a moving image mode, the timing controller 120 sequentially generates the first and second exposure control signals, such that frame image signals having different illumination degrees can be continuously generated.

The image sensor 130 converts an optical signal captured by a camera (not shown) into an electrical signal according to the exposure control signal generated from the timing controller 120. In this case, the image sensor 130 acquires an image during an interval of the exposure control signal, such that it generates image signals having different illumination degrees. The image sensor 130 converts output signals of optical components of the camera or an optical signal captured by the optical components into electrical signals, and the electrical signals can be converted to digital image data. The image sensor 130 may be implemented independent of an optical system of the camera. It is assumed that the optical system of the camera is independent of the image sensor 130 in an embodiment of the present invention. It is assumed that the image sensor 130 includes a signal processor for converting the optical/electric-conversion electric signal into a digital image signal. In this case, the signal processor may be implemented with a Digital Signal Processor (DSP). The DSP can control an acquisition time of the output image signal of the image sensor upon receiving the output exposure control signal from the timing controller 120.

The memory 150 includes a storage area for storing two or more image data units acquired from the image sensor 130. The two or more image data units acquired from the image sensor 130 are indicative of image data having different illumination degrees, and it is assumed that the two or more image data units are equal to image data in frame units. It is assumed that two image data units are reconstructed in an embodiment of the present invention. The memory 150 includes a buffer area for storing first and second frame image data. The first and second frame buffers store image signals generated from the image sensor 130, respectively. In this case, the first frame buffer stores an image signal of the frame generated from an interval during which the first exposure control signal is generated, and the second frame buffer stores an image signal of the other frame generated from an interval during which the second exposure control signal is generated.

The memory 150 may include a Read Only Memory (ROM) for storing a variety of programs and important information of the digital camera, and a Random Access Memory (RAM) for temporarily storing data generated during a program execution time. In this case, the ROM may include a program memory for storing programs and a plurality of flash memories for storing important information. The program memory may store the inventive program according to an embodiment of the present invention. Each flash memory may store processed screen image data.

The display 160 may display a variety of menu information needed for an image capturing process and a captured screen image upon receiving a control signal from the image controller 110. The display 160 may be implemented with a Liquid Crystal Display (LCD).

Figure 6:
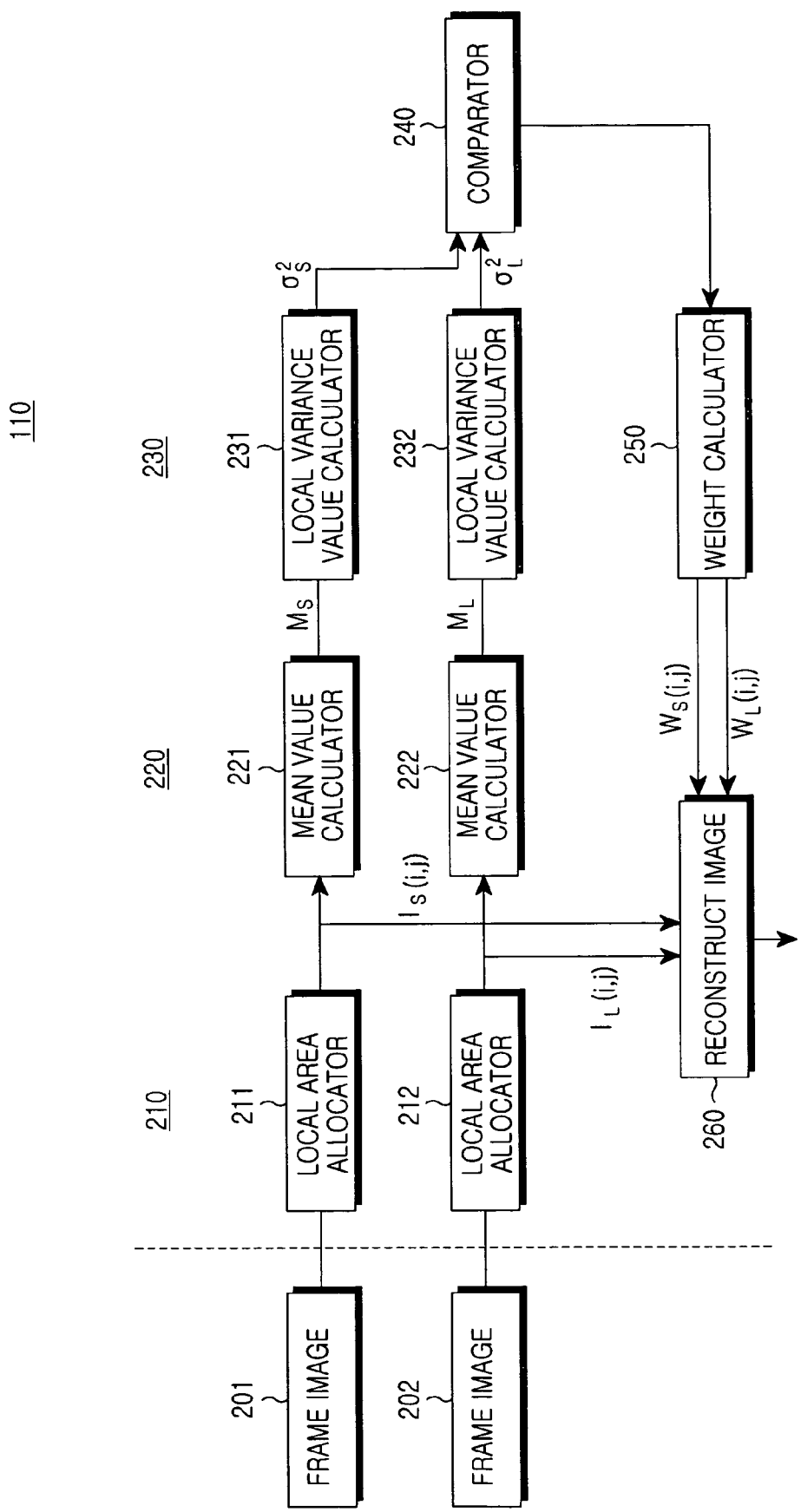
FIG. 6 is a block diagram illustrating an image controller of FIG. 5 in accordance with an embodiment of the present invention.
Figure 9:
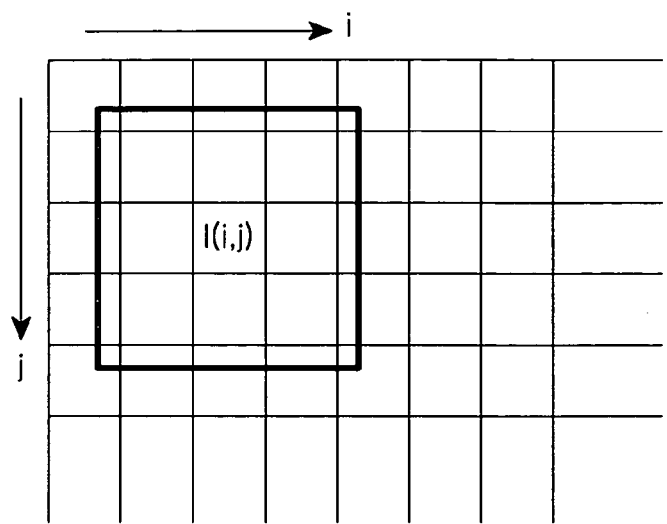
FIG. 9 is an example for assigning acquired first and second images to a local area in accordance with an embodiment of the present invention.

FIG. 6 is a block diagram illustrating the image controller 110 of FIG. 5 in accordance with an embodiment of the present invention. FIG. 9 is an example for assigning acquired first and second images to a local area in accordance with an embodiment of the present invention.

A method for reconstructing two or more images having different illumination degrees in accordance with an embodiment of the present invention may be classified into first to third methods. The first method pre-captures and stores picture images having a high illumination difference therebetween, and performs the image reconstruction mode. In this case, the image controller 110 reads two frame image data units having different illumination degrees from the first and second frame buffers, such that it can reconstruct a resultant screen image. The second method captures two image screens having different illumination degrees in the image reconstruction mode, and reconstructs frame image data of the captured screen image. The third method processes successively-captured moving image signals having a speed difference therebetween in each frame unit, such that it can reconstruct a screen image.

Referring to FIG. 6, the first frame buffer 201 and the second frame buffer 202 store frame image data having different illumination degrees, respectively. The local area allocators 211 and 212 establish local areas for calculating individual variance values of frame image data as shown in FIG. 9. Specifically, when calculating variance values of the first and second frame image data, variance values of the local area images are calculated instead of calculating variance values of an overall image. A weight is determined by comparing the variance values, and the determined weight is applied to the local image in such a way that an image is reconstructed. The image reconstruction is performed in local area units. The local area allocators 211 and 212 determine a local area of frame image data. In this case, the local area may comprise at least 3×3 pixels as shown in FIG. 9. The mean value calculators 221 and 222 calculate mean values of image pixels of the allocated local area, respectively. The local variance value calculators 231 and 232 receive the mean values of the local area image from the mean value calculators 221 and 222, and calculate local variance values using the received mean values.

In this case, a method for calculating the local variance values will hereinafter be described.

A mean value of N image data is calculated when calculating a variance value from the N image data, and a difference between N data and the calculated mean value is squared and averaged, such that a desired variance value is calculated as denoted by the following expressions:

N data: $D(n)$, where $n=1, 2, \ldots, N$

Mean value of N data: $m=(D(1)+D(2)+\ldots+D(N))/N$

Variance: $\mathrm{Var}(D)=((D(1)-m)^2+(D(2)-m)^2+\ldots+(D(N)-m)^2)/N$

As can be seen from FIG. 9, in the case of comparing the aforementioned variance calculation method with the other method for calculating variance of 3×3 area centering around a specific point $I(i,j)$ in an exemplary image in which a parameter 'i' increases from the left side to the right side and the other parameter 'j' increases from the upper side to the lower side by means of the local area allocators 211 and 212, it is determined that the other method calculates a desired variance using nine data units. The following equation 1 represents a mean value of image data in the mean value calculators 221 and 222, and the following equation 2 represents variance of the image data in the variance value calculators 231 and 232.

$$M(i, j) = \frac{\sum_{r=-1}^{1} \sum_{s=-1}^{1} I(i+r, j+s)}{9} \quad \text{Equation 1}$$

$$\text{Var}(I(i, j)) = \frac{\sum_{r=-1}^{1} \sum_{s=-1}^{1} [I(i+r, j+s) - M(i, j)]^2}{9} \quad \text{Equation 2}$$

With reference to Equations 1 through 2, 'i' is an X-axis coordinate, 'j' is a Y-axis coordinate, 'r' is a displacement of the X-axis coordinate in the 3×3 area, 's' is a displacement of the Y-axis coordinate in the 3×3 area, I(i,j) is a pixel value of an image at a coordinate (i,j), M(i,j) is a mean value of pixel values in the 3×3 area centering around the coordinate (i,j), and Var(I(i,j)) is variance of pixel values in the 3×3 area centering around the coordinate (i,j).

Local variance values of individual pixels are calculated simultaneously while moving a target area to another area using Equations 1 and 2. In this case, although the local variance calculation area extends from the 3×3 area to a 5×5 or bigger area, local variance values of individual pixels can also be calculated by changing the variables 'i' and 'j' of Equations 1 through 2 to other variables.

If the mean and variance values of the image data of individual local areas are calculated using Equations 1 through 2 while moving a target area to another area in area units, then the comparator 240 receives variance values of the above two local images from the variance value calculators 231 and 232, and compares the received variance values with each other. The weight calculator 250 calculates a weight for reconstructing the image using Equations 4 through 5 according to the result of the comparison between the output variance values of the comparator 250. The image reconstruction unit 260 applies the determined weights denoted by Equations 4 through 5 to local area images, such that the image can be reconstructed using the following equation 3.

Provided that a value of a pixel positioned at a coordinate (i,j) of a first image $I_s$ acquired at a specific exposure value is determined to be $I_s(i,j)$, and a value of a pixel positioned at a coordinate (i,j) of a second image $I_L$ having another exposure value different from the specific exposure value is determined to be $I_L(i,j)$, a resultant image R(i,j) can be denoted by the following equation 3:

$$R(i,j) = W_S(i,j) \times I_S(i,j) + W_L(i,j) \times I_L(i,j) \quad \text{Equation 3}$$

In this case, provided that variances calculated in a local area centering around the coordinate (i,j) of the resultant image are determined to be $\sigma_S^2(i,j)$ and $\sigma_L^2(i,j)$, weights $W_S(i,j)$ and $W_L(i,j)$ for calculating the resultant image R(i,j) denoted by Equation 3 can be represented by the following equations 4 and 5, respectively. The weights $W_S(i,j)$ and $W_L(i,j)$ satisfy the following equation 6.

Equation 4

$$W_S(i, j) = \frac{\sigma_S^2(i, j) + 1}{[\sigma_S^2(i, j) + 1] + [\sigma_L^2(i, j) + 1]} \quad \text{Equation 4}$$

-continued $$W_L(i, j) = \frac{\sigma_L^2(i, j) + 1}{[\sigma_S^2(i, j) + 1] + [\sigma_L^2(i, j) + 1]} \quad \text{Equation 5}$$

$$W_S(i,j) + W_L(i,j) = 1 \quad \text{Equation 6}$$

When the weight calculator 250 calculates the weights $W_S(i,j)$ and $W_L(i,j)$ denoted by Equations 4 and 5, a predetermined value '1' is added to a variance such that a zero-variance case can be prevented in an emergency.

After calculating the local variance value, the comparator 240 receives local variance values of the first and second frame image data, and compares the received local variance values with each other. In this case, images of local areas of the first and second frame images comprise the same pixels. The weight value calculator 250 determines the weights $W_S$ and $W_L$ of Equations 4 through 5 according to a comparison result signal of the comparator 240. In this case, if a local variance value of an image captured during a short exposure time is higher than that of the other image captured during a long exposure time, the weight value calculator 240 determines that the weight $W_S$ of the local image acquired during the short exposure time is higher than the weight $W_L$ of the other local image acquired during the long exposure time. If a local variance value of an image captured during the long exposure time is higher than that of the other image captured during the short exposure time, the weight value calculator 240 determines that the weight $W_S$ of the short-exposure local image acquired from a corresponding local area is lower than the weight $W_L$ of the long-exposure local image.

If the weights $W_S$ and $W_L$ are determined as described above, the image reconstruction unit 260 synthesizes an image using Equation 3 such that the image is reconstructed. The sum of the weights $W_S$ and $W_L$ is equal to '1', such that a value higher than the maximum value of image data cannot be calculated as resultant data. Therefore, the image data reconstructed by the image reconstruction unit 260 determines its weight according to a variance value of image data having an illumination difference, such that brightness of a target object and the other brightness of a background image can be controlled.

The aforementioned local-image reconstruction operation is performed until the last local image of the frame image is reconstructed. If the last local image reconstruction is terminated, the aforementioned image reconstruction operation is also terminated. The first and second frame images 201 and 202 are each processed by a local area allocator, a mean value calculator, and a variance value calculator, however, the local area allocator, the mean value calculator and the variance value calculator may be integrated into one body. Specifically, local area allocation, mean value calculation, and variance value calculation operations are performed on the first frame image 201, and the resultant data is stored in the memory 150. Thereafter, when performing local area allocation, mean value calculation, and variance value calculation operations of the second frame image 202, local variance values of the stored first frame image 201 must be accessed and processed. Specifically, the image controller 110 calculates/stores variance values of the local images of the first frame image, calculates variance values of the local images of the second frame image, and compares the local variance values of the first frame image with those of the second frame image. According to the result of the comparison, the image controller 110 determines the weights $W_S$ and $W_L$ in different ways such that a local image can be reconstructed.

Figure 10:
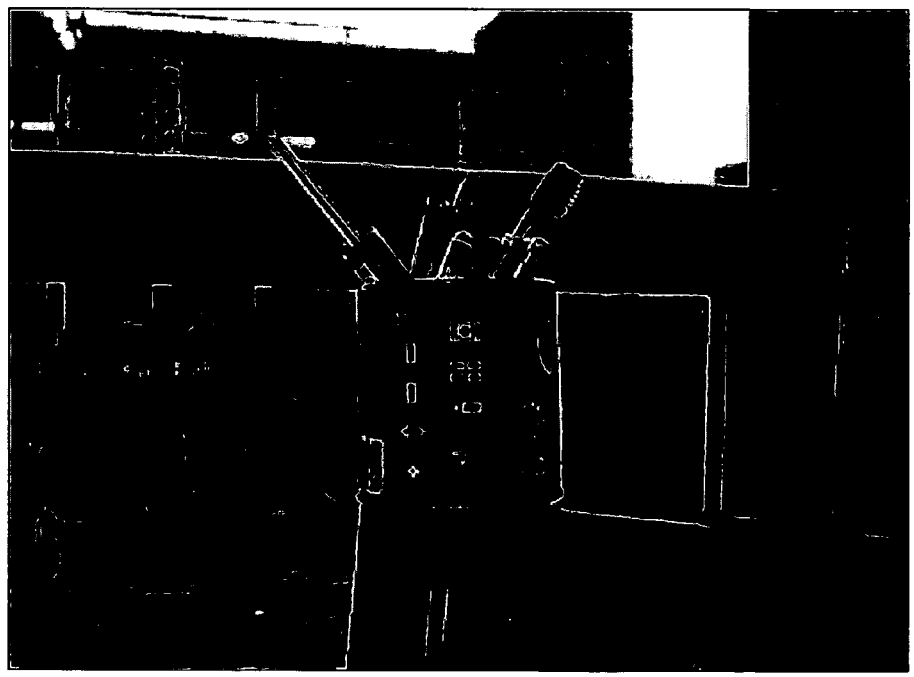
FIG. 10 is an exemplary picture in which a picture image having a high illumination difference is reconstructed in accordance with an embodiment of the present invention.

In the case of reconstructing local images using the configuration of FIG. 6, two images shown in FIGS. 1A through 1B are reconstructed as shown in FIG. 10, resulting in an improved image quality. Specifically, if an image reconstruction operation is performed according to an embodiment of the present invention using a first image in which a background part having high illumination is saturated because an exposure is adjusted to a low-illumination target object as shown in FIG. 1A, and a second image in which a target object having relatively-low illumination is too dark because an exposure is adjusted to a background part as shown in FIG. 1B, the best image having no reduced image quality can be created in all of the target object and the background part.

When reconstructing an image using the weights of Equations 4 through 5, the quality of images having a high illumination difference is remarkably improved. The quality of other images having a low illumination difference is hardly affected even though the image is reconstructed using the weights of Equations 4 through 5. If two or more images acquired under a specific state having little exposure time difference are reconstructed according to the present invention, the reconstructed result hardly affects an original image. Specifically, provided that little difference in exposure time occurs, this means $I_S(i,j) \cong I_L(i,j)$, such that the resultant image $R(i,j)$ can be denoted by $R(i,j)=[W_S(i,j)+W_L(i,j)] \times I_S(i,j) = I_S(i,j)$. In this case, the quality of a reconstructed image is equal to that of the original image.

Figure 7:
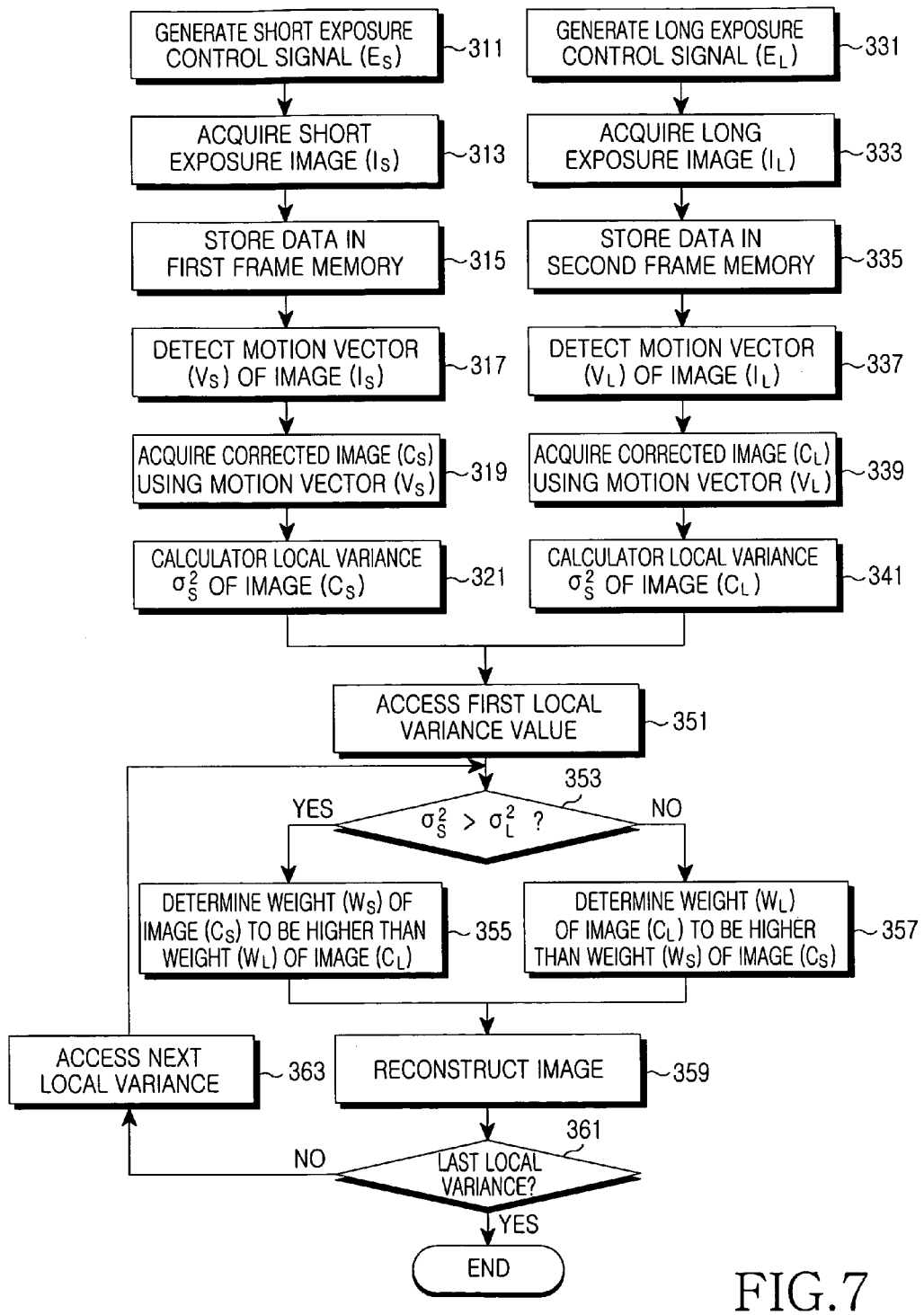
FIGS. 7 through 8 are flow charts illustrating procedures for acquiring and reconstructing a picture image having a high illumination difference in accordance with an embodiment of the present invention.

FIG. 7 is a flow chart illustrating a method for controlling the device of FIG. 5 to reconstruct two or more images having a high illumination difference therebetween in accordance with a preferred embodiment of the present invention. Specifically, FIG. 7 depicts a method for capturing two images having different illumination degrees, pre-processes the captured image, allows pixel positions of the two images to be equal to each other, and reconstructs an image according to variance values of the images.

Referring to FIG. 7, if a user selects an image reconstruction mode, the image controller 110 confirms the user's selection using the entry unit 140, and outputs a control signal for performing the image reconstruction mode to the timing controller 120. The timing controller 120 generates first and second exposure control signals for determining different exposure times. In this case, the first exposure control signal has a short exposure time, and the second exposure control signal has a relatively-long exposure time as compared to the first exposure control signal. The image sensor receiving the aforementioned exposure control signals generates frame image data (hereinafter referred to as first frame data) captured during a generation time of the first exposure control signal. The first frame image data generated from the image sensor 130 is stored in the first frame buffer of the memory 150. The image controller 110 outputs the first frame image data on the display 160 such that the display 160 displays the received first frame image data. In this case, the first frame data may be displayed as shown in the image of FIG. 1A. The image sensor 130 generates frame image data captured during a generation time of the second exposure control signal. The second frame image data generated from the image sensor 130 is stored in the second frame buffer of the memory 150. The image controller 110 outputs second frame image data on the display 160 such that the display 160 displays the second frame image data. In this case, the second frame data may be displayed as shown in the image of FIG. 1B. Two frame image data captured at different illumination differences during the first and second exposure times are stored in the first and second frame buffers of the memory 150, respectively. The image controller 110 receives the first and second frame image data, and reconstructs frame image data. A method for controlling the image controller 110 to reconstruct an image calculates a first local variance of the first frame image data acquired during a short exposure time and a second local variance of the second frame image data acquired during a long exposure time, and applies a weight to the larger of the first and second local variances in such a way that frame image data is reconstructed. In the case of reconstructing frame image data using the aforementioned method, a target object image and a background image of the target object are more clearly shown in the reconstructed frame image data. The aforementioned reconstructed frame image data is displayed on the display 160, and an image displayed on the display 160 may be displayed as shown in FIG. 10.

A method for reconstructing an image using a digital camera selectively controls an exposure time during which an image is captured by the image sensor 130. The embodiment of the present invention receives a first image captured during a short exposure time and a second image captured during a long exposure time from the image sensor 130, and stores the first image and the second image in the first and second frame buffers, respectively. The image controller 110 sequentially reads first and second frame image data respectively stored in the first and second frame buffers, and reconstructs a resultant image. The image controller 110 stores the last resultant image in the memory 150, and displays it on the display 160.

A picture image is captured during a short exposure time, and a local variance value of the captured picture image is calculated at steps 311 through 321. A picture image is captured during a relatively long exposure time, and a local variance value of the captured picture image is calculated at steps 331 through 341.

Figure 11:
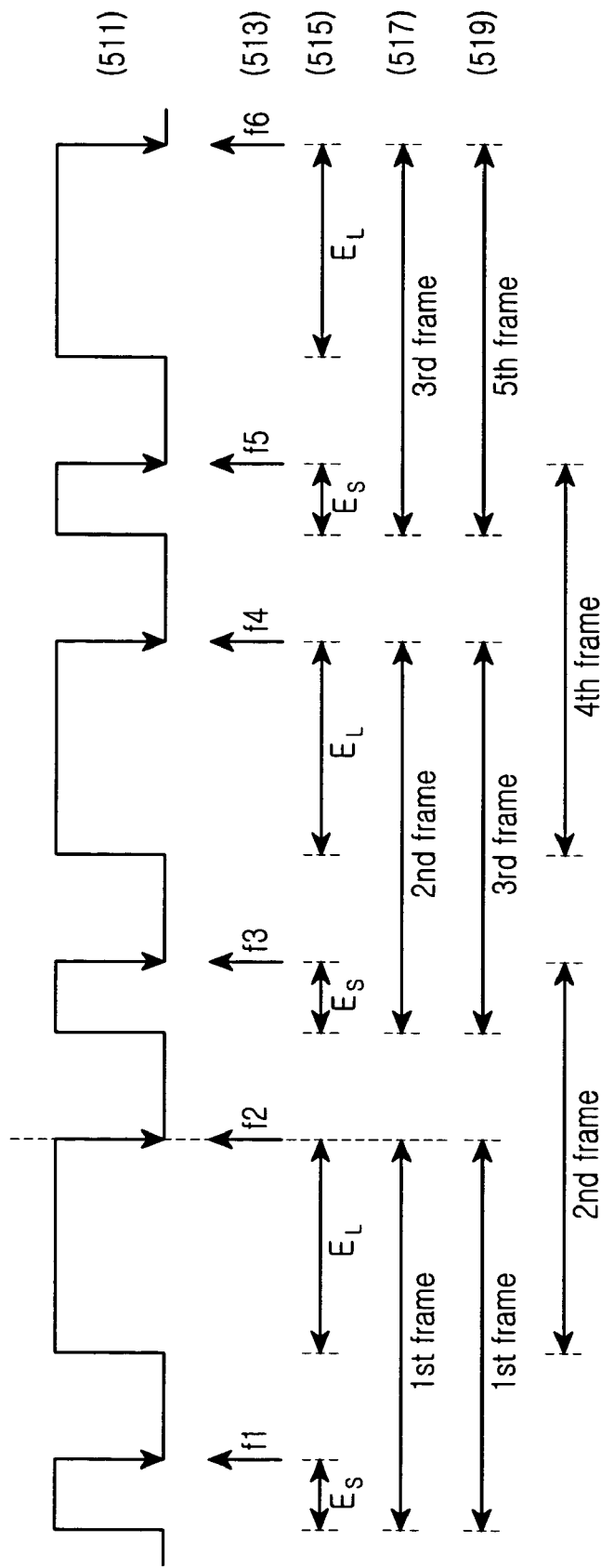
FIG. 11 is a timing diagram illustrating individual times at which an image sensor is controlled to acquire picture images having a high illumination difference in accordance with an embodiment of the present invention.

Referring to steps 311 through 315, the image controller 110 outputs a first exposure control signal to the timing controller 120 such that a target object is captured during a short exposure time $E_s$ as shown in reference number 515 of FIG. 11. The timing controller 120 outputs the first exposure control signal having a short exposure time to the image sensor 130 at step 311. The image controller 110 receives image data from the image sensor 130 during the time $E_s$ at step 313, and stores image data $I_s$ generated from the image sensor 130 in the first frame buffer of the memory 150 at step 315. If the first frame image data has been stored in the first frame buffer, the image controller 110 gains access to the short-exposure image data $I_s$ stored in the first frame buffer, such that an image is pre-processed and a local variance value is calculated.

Referring to steps 331 through 335, the image controller 110 outputs a second exposure control signal to the timing controller 120 such that a target object is captured during a relatively-long exposure time $E_L$. The timing controller 120 outputs the second exposure control signal to the image sensor 130 at step 331. The image controller 110 receives image data from the image sensor 130 during the time $E_L$, and stores image data $I_s$ generated from the image sensor 130 in the second frame buffer of the memory 150 at step 335. In this case, the image data $I_L$ acquired at step 333 is captured during an exposure time longer than that of the image data $I_s$ acquired at the above step 313, such that its illumination degree is different from that of the image data stored in the first frame buffer. The image data $I_s$ stored in the first frame buffer may be equal to image data of FIG. 1A, and the other image data $I_L$ stored in the second frame buffer may be equal to image data of FIG. 1B. Thereafter, the image controller 110 gains access to the long-exposure image data $I_L$ stored in the second frame buffer, such that an image is pre-processed and a local variance value is calculated.

Referring to the image pre-processing operation performed at steps 317 through 319 and 337 through 339, a pixel position of a first image must be equal to that of a second image in order to reconstruct a resultant image using two or more images. However, if the user directly takes a picture using their digital camera, their hands tremble even if the user is dexterous, such that a blurred image created due to the trembling also occurs. Therefore, the image controller 110 detects a motion vector Vs of the long-exposure image $I_s$ at step 317, and acquires a corrected image $C_s$ using the motion vector $V_s$ at step 319. The image controller 110 detects a motion vector $V_L$ of the long-exposure image $I_L$ at step 337, and acquires a corrected image $C_L$ using the motion vector $V_L$ at step 339.

When processing an image using two or more picture images as described above, there arises a problem in which positions of corresponding pixels in two or more picture images are different from each other due to the user's hand trembling generated during an image capturing time. As stated above, if pixel positions of individual picture images are different from each other when two or more picture images are processed, an image reconstruction effect of the present invention may be deteriorated. In order to solve the aforementioned problem, an image automatic stabilization function for correcting the captured image's trembling caused by the user's hand trembling can be used. The image automatic stabilization function estimates a motion vector for use in a motion image compression algorithm, such that the blurred image can be corrected. If the image is badly blurred, an image reconstruction operation of the present invention may be unavailable. In this case, the embodiment of the present invention may determine whether the image reconstruction method is applied or not upon receipt of the estimation result of the motion vector.

If a target object is not captured by a fixed camera, it is difficult to acquire the same picture image. Specifically, if a user who holds a camera in their hands takes a picture of a desired target object using the camera, pixel positions of picture images are slightly differently captured as shown in FIGS. 1A through 1B. Even in the aforementioned case, pixel positions of the picture images can be equal to each other using the motion vector estimation result.

Not only the method for controlling pixel positions of the picture images to be equal to each other using the aforementioned motion vector, but also a method for determining a center pixel position of a picture image can be used by a user. In this case, a user-indicated pixel is determined to be a center pixel during the image pre-processing process, such that pixel positions of the picture images can be re-adjusted.

Thereafter, the image controller 110 calculates a local variance associated with the first frame image data at step 321, and calculates a local variance associated with the second frame image data at step 341.

Referring to a method for calculating the local variance values at steps 321 and 341, a mean value of N image data is calculated when calculating a variance from the N image data, and a difference between N data and the calculated mean value is squared and averaged, such that a desired variance value is calculated. When calculating variance of the 3×3 area centering around the image I(i,j) in an exemplary image in which a parameter 'i' increases from the left side to the right side and the other parameter 'j' increases from the upper side to the lower side as shown in FIG. 9, the variance is calculated using nine data units denoted by N=9. Equation 1 represents a mean value of image data, and Equation 2 represents variance of the image data. Local variance values of individual pixels are calculated simultaneously while moving a target area to another area using Equations 1 through 2. In this case, although the local variance calculation area extends from the 3×3 area to a 5×5 or bigger area, local variance values of individual pixels can also be calculated by changing the variables 'i' and 'j' of Equations 1 through 2 to other variables.

If the mean and variance values of the image data of individual local areas are calculated using Equations 1 through 2 while moving a target area to another area in area units, the image controller 110 compares variance values of the two local images to determine a weight, and reconstructs a resultant image at steps 351 through 363.

Referring to the aforementioned image reconstruction operation, resultant image data is reconstructed by the variance values calculated at steps 321 and 341. The aforementioned image reconstruction method applies a higher weight to a high-variance side of the local area, such that an image is reconstructed. In this case, the image controller 110 must determine a method for applying the weight. Provided that images really captured by the camera have a low illumination difference therebetween when the resultant image is reconstructed by applying different weights to two images having different exposure times, there is a need for the inventive image reconstruction method not to affect the captured image.

Provided that a value of a pixel positioned at a coordinate (i,j) of a first image $I_s$ acquired at a specific exposure value is determined to be $I_s(i,j)$, and a value of a pixel positioned at a coordinate (i,j) of a second image $I_L$ having another exposure value different from the specific exposure value is determined to be $I_L(i,j)$, a resultant image R(i,j) can be denoted by Equation 3. In this case, provided that variances calculated in a local area centering around the coordinate (i,j) of the resultant image are determined to be $\sigma_S^2(i,j)$ and $\sigma_L^2(i,j)$, weights $W_S(i,j)$ and $W_L(i,j)$ for calculating the resultant image R(i,j) denoted by Equation 3 can be represented by Equations 4 and 5, respectively. The weights $W_S(i,j)$ and $W_L(i,j)$ shown in Equations 4 and 5 satisfy Equation 6.

As described above, the image controller 110 gains access to the first variance value of the first and second frame image data at step 351, and compares the accessed variance values with each other at step 353. In this case, images of the local areas of the first and second frame images comprise the same pixels, and positions of the pixels have previously been corrected by the pre-processing process. The image controller 110 compares a variance value of the same pixels of the first frame image data with the other variance value of the same pixels of the second frame image data in local area units at step 353. In this case, if a local variance value of the image captured during a short exposure time is higher than that of another image captured during a long exposure time, the image controller 110 determines weights $W_s$ and $W_L$ of Equations 4 through 5 at step 355. In this case, the weight $W_s$ of the short-exposure local image is determined to be higher than the weight $W_L$ of the long-exposure local image. If the local variance value of the image captured during the long exposure time is higher than that of the image captured during the short exposure time at step 353, the image controller 110 determines the weights $W_s$ and $W_L$ of Equations 4 through 5 at step 357. In this case, the weight $W_s$ of the short-exposure local image is determined to be less than the weight $W_L$ of the long-exposure local image.

If the weights $W_s$ and $W_L$ are determined as described above, the image controller 110 synthesizes an image using Equation 6, such that the image is reconstructed at step 359. In this case, the sum of the weights $W_s$ and $W_L$ is equal to '1', such that a value higher than the maximum value of image data cannot be calculated as resultant data. If the local variance values are compared with each other and an image is reconstructed according to the result of the comparison, then the image controller 110 determines whether a currently-reconstructed image is equal to the last local area image at step 361. If it is determined that the currently-reconstructed image is not equal to the last local area image at step 361, the image controller 110 gains access to a variance value of the next local image at step 363, and returns to step 353, such that the accessed local variance values are continuously compared with each other at step 353. Thereafter, if the last local image is reconstructed at step 361, the image controller 110 detects the reconstructed last local image, and terminates the above image reconstruction operation.

The image controller 110 repeatedly performs steps 351 through 363, and determines the weights $W_s$ and $W_L$ according to the comparison result of variance values of the local images in such a way that a local image is reconstructed. Therefore, if the local images are reconstructed as described above, two images of FIGS. 1A through 1B are reconstructed as shown in FIG. 10. Therefore, if the image is reconstructed using the method of FIG. 8, it can be recognized that image quality is improved as shown in FIG. 10. If an image reconstruction operation is performed using a first image in which a background part having high illumination is saturated because an exposure is adjusted to a low-illumination target object as shown in FIG. 1A, and a second image in which a target object having relatively-low illumination is too dark because an exposure is adjusted to a background part as shown in FIG. 1B, the best image having no reduced image quality can be created in all of the target object and the background part as shown in FIG. 10.

When reconstructing an image using the weights of Equations 4 through 5, the quality of images having a high illumination difference is remarkably improved. The quality of other images having a low illumination difference is hardly affected even though the image is reconstructed using the weights of Equations 4 through 5. If two or more images acquired under a specific state having little exposure time difference are reconstructed according to the present invention, the reconstructed result hardly affects an original image. Specifically, provided that little difference in exposure time occurs, this means $I_s(i,j) \cong I_L(i,j)$, such that the resultant image $R(i,j)$ can be denoted by $R(i,j)=[W_S(i,j)+W_L(i,j)] \times I_S(i,j)=I_S(i,j)$. In this case, a reconstructed image is equal to the original image.

FIG. 7 is a flow chart illustrating a method for calculating a local variance value after performing an image pre-processing operation. However, if an image can be captured without being affected by the blurred image when the camera captures the image, i.e., if the image is captured by the camera fixed to one position, the pre-processing function may not need to be performed. Therefore, the pre-processing function may be selectively used by a user if needed.

If two or more images are reconstructed in the form of only one image when the pre-processing function is not used, the first image is acquired and the second image is then acquired, and their local variance values are calculated, such that an image can be reconstructed. Specifically, resultant data is calculated using only a local area when reconstructing an image in accordance with an embodiment of the present invention, such that the local image can be reconstructed simultaneously while acquiring a second image after a first image has been acquired and stored in a memory. In this manner, the embodiment of the present invention can perform a real-time process according to processor performance or algorithm optimization.

Figure 8:
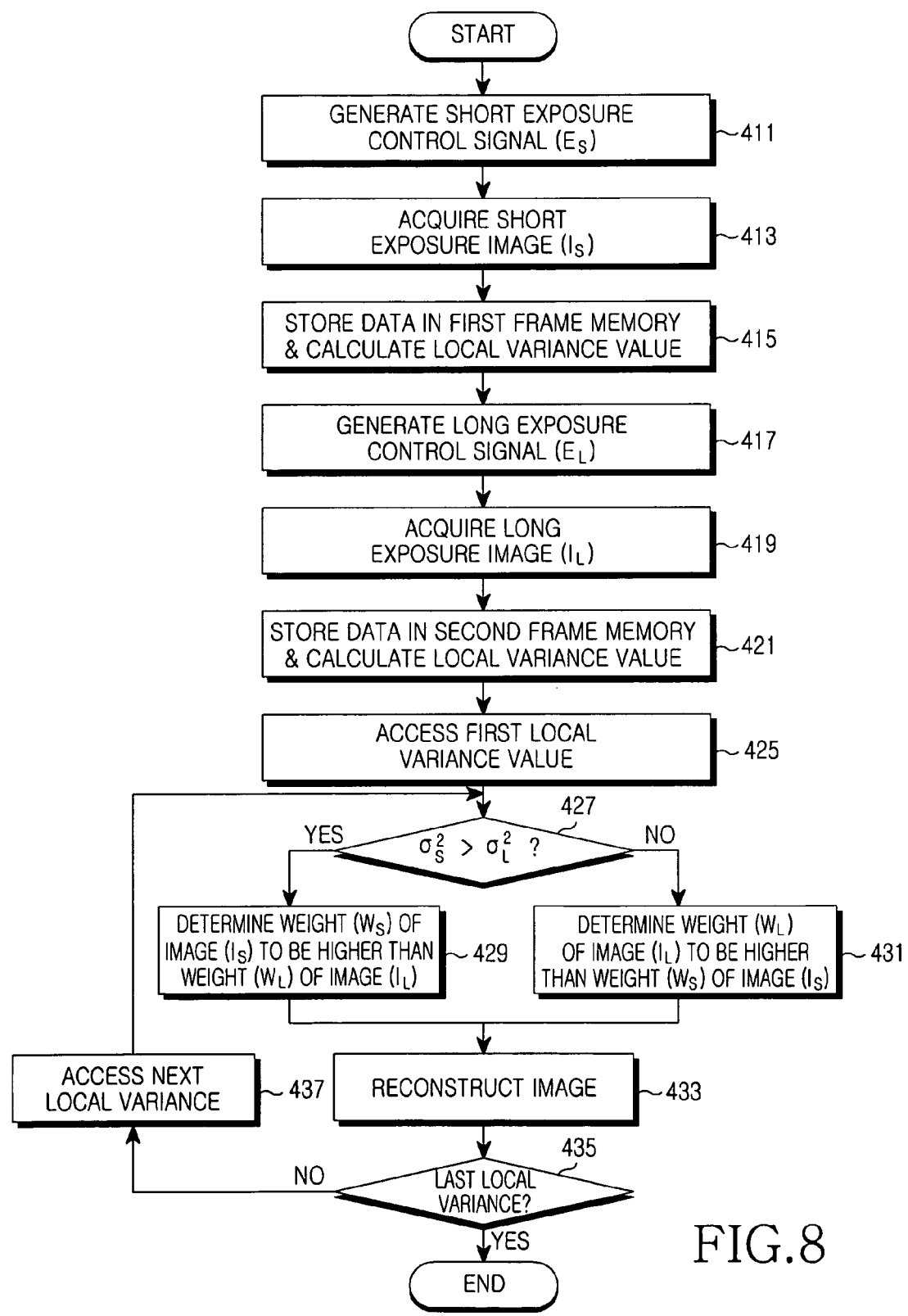

FIG. 8 is a flow chart illustrating a procedure for calculating local variance values of individual frame images when the first frame image is stored and the second frame image is acquired, such that an image can be reconstructed. In this case, image data transmitted from the image sensor 130 may be transmitted to the image sensor 110 in line units. Image data transmitted from the image sensor 130 is stored in the memory 150, and at the same time variance values of images of a local area can be calculated.

Referring to FIG. 8, the image controller 110 generates a first exposure control signal having a short exposure time at step 411, captures image data while the first exposure control signal is generated at step 413, and outputs the captured image data in line units. The image controller 110 stores the first frame image data acquired from the image sensor 130 in the first frame buffer in line units. The image controller 110 calculates a local variance value of a local area of image data stored in the first frame buffer, and stores the calculated local variance value at step 415. Thereafter, the image controller 110 generates a second exposure control signal having a short exposure time at step 417, acquires second frame image data from the image sensor 130 while the second exposure control signal is generated at step 419, and stores the second frame image data acquired from the image sensor 130 in the second frame buffer in line units. The image controller 110 calculates a local variance value of the second frame image data stored in the first frame buffer at step 421.

Therefore, if the image controller 110 starts calculating the local variance value of the second frame image data, the image controller 110 gains access to a first local variance value of the first frame image data and a second local variance value of the second frame image data at step 425, and compares the first local variance value with the second local variance value at step 427. In this case, the image controller 110 continuously perform the operation for storing the second frame image data acquired from the image sensor 130 in the first frame buffer and the operation for calculating a local variance value of the second frame image data. In this case, steps 425 through 437 of FIG. 8 are equal to steps 351 through 363 of FIG. 7.

A method for acquiring an image from the camera to perform image reconstruction is exemplarily shown in the image reconstruction procedures of FIGS. 7 through 8. The image reconstruction procedure in accordance with an embodiment of the present invention can reconstruct two or more images received from an external part in the form of only one image. Specifically, two or more images having different exposure times (see FIGS. 1A through 1B) are received from the external part (e.g., a disc or a communication module), the procedure of FIG. 8 is performed on the received images, such that the received images can be reconstructed in the form of only one image.

In accordance with an embodiment of the present invention, a short exposure signal $E_s$ and a long exposure signal $E_L$ are successively generated, and at the same time moving images having different exposures can be successively reconstructed. FIG. 11 is a timing diagram illustrating individual times at which the image sensor 110 acquires images having different illumination degrees using a digital camera of FIG. 5 in accordance with an embodiment of the present invention. Referring to FIG. 11, reference numeral 511 indicates the first and second exposure control signals generated from the timing controller 120, reference numeral 513 is indicative of a time at which the image sensor 130 outputs a frame image signal, and reference numeral 515 is indicative of a second exposure time. Reference numerals 517 and 519 indicate a method for improving the quality of two images in accordance with an embodiment of the present invention. Specifically, reference numeral 517 indicates a method for processing two frame image signals in the form of only one frame image signal, and reference numeral 519 indicates a method for sequentially processing two successive frame image signals to create a successive frame image signal.

If the exposure control signals having different exposure times are successively generated as shown in FIG. 11, the digital camera device of FIG. 5 can reconstruct an image of a moving image signal. Specifically, the camcorder or a device having a camcorder module can capture a plurality of frame image data per second. In this case, when capturing the frame image signal, the timing controller 120 generates an exposure control signal for successively repeating the first exposure time (i.e., short exposure) and the second exposure time (i.e., long exposure) as denoted by reference number 513 of FIG. 11. However, the image sensor 130 generates frame image signals captured during the exposure time such as reference number 515 of FIG. 11 at the same times as those of reference number 513 of FIG. 11. The image controller 110 calculates local variance values of the two frame image signals using the aforementioned method, analyzes the calculated variance values, and applies a predetermined weight to the bigger of the two variance values, such that two frame image data can be reconstructed as one image frame data. In the case of reconstructing an image using the method of reference number 517 of FIG. 11, frame image data units equal to ½ of frames really captured by the camera can be generated. In addition to the image reconstruction method based on the method denoted by reference number 517, a method for reconstructing two successive frame image data in only one frame may also be used. Specifically, one frame image data is reconstructed using the first and second frame image data successively generated as shown in reference number 519 of FIG. 11, and a method for reconstructing one frame image data using the second frame image data and the following first frame image data.

Image data of 30 frames per second is necessary for smooth reproduction of the moving image signal. In this case, a camcorder for use in a specific scheme must capture one scene two times. In order to apply the aforementioned method to a moving image capturing process, an image capturing speed of 60 frames per second is needed On the assumption that the moving image comprises 30 frames per second (i.e., 30 frames/s). If the camcorder based on the aforementioned scheme is processed by the method of reference number 519 of FIG. 11, another camcorder capable of capturing 30 frames per second can reconstruct an image comprising 30 frames.

The user's hand may tremble when capturing a moving image, such that there arises unexpected movement between a first image captured during a short exposure time and a second image captured during a relatively-long exposure time. As a result, an extreme image difference may occur between the first and second images. In this case, a pre-processing step tracks the movement of the image before starting the image reconstruction process of the present invention. Therefore, if extreme image variation occurs, the present invention directly uses an original image without applying the inventive algorithm to the image reconstruction process. Otherwise, if slight image variation occurs, the embodiment of the present invention adapts the inventive algorithm to the image reconstruction process such that it can acquire a resultant image.

The image reconstruction method in accordance with an embodiment of the present invention may be applied to a mobile phone equipped with a camera.

Figure 12:
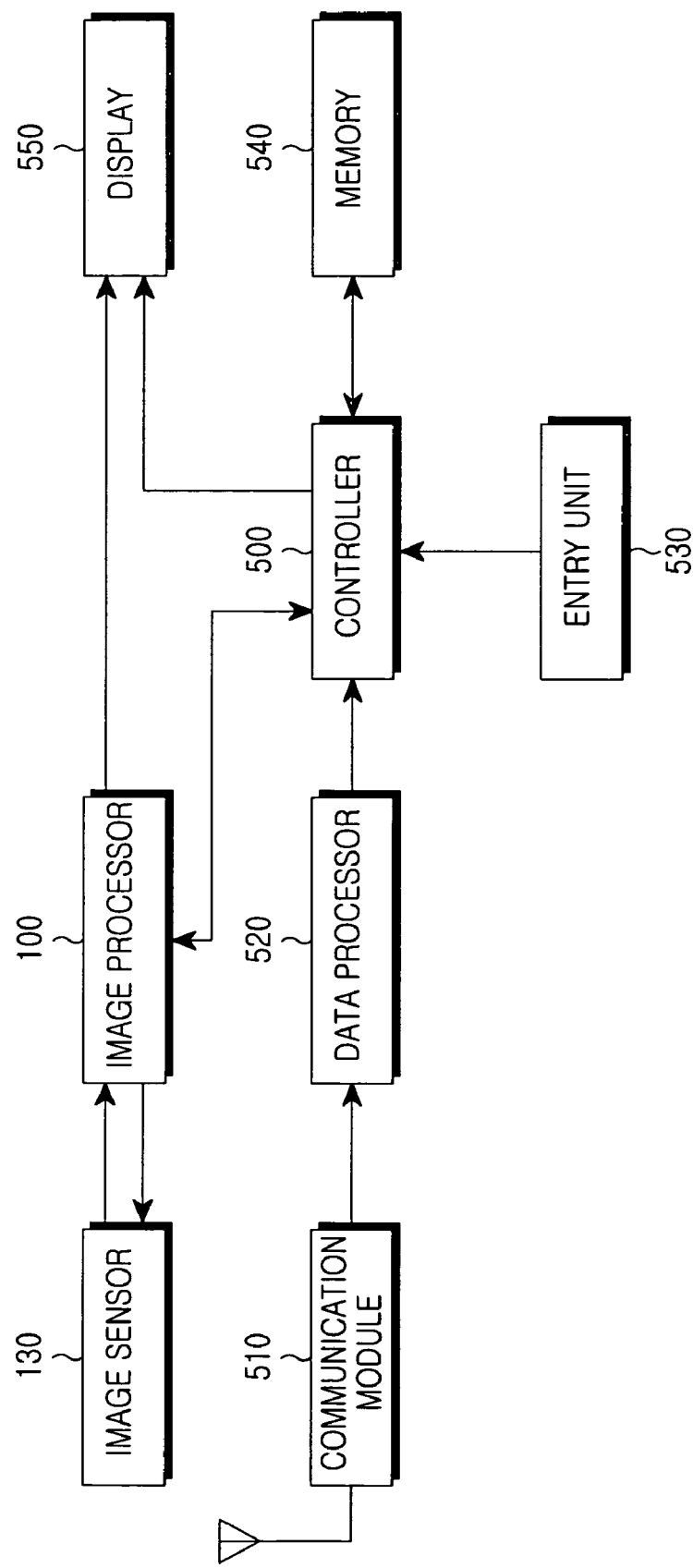
FIG. 12 is a block diagram illustrating an example formed by applying the device of FIG. 6 to a mobile phone or terminal.

FIG. 12 is a block diagram illustrating the mobile phone (also called a hand-held phone) based on the image reconstruction method in accordance with a preferred embodiment of the present invention.

Referring to FIG. 12, a communication module 510 includes a frequency up converter & down converter to perform a Radio Frequency (RF) communication function. The data processor 520 may include a MODEM (MOdulator & DEModulator) and a CODEC (COder & DECoder) to perform CDMA communication. The data processor 520 modulates/demodulates transmitted/received signals, and encodes/decodes the modulated/demodulated result signals. The controller 500 controls overall image reconstruction operations of the mobile phone in accordance with an embodiment of the present invention. In this case, the data processor 520 and the controller 500 may be integrated into one body. The entry unit 530 may generate a variety of commands and key signals to perform the image reconstruction operation in accordance with an embodiment of the present invention. The memory 540 stores data for performing a variety of operations of the mobile phone and data generated during an operation time of the mobile phone. The memory 540 can store picture images for image reconstruction and reconstructed picture images in accordance with an embodiment of the present invention. The display 550 displays a variety of data generated during an operation time of the mobile phone upon receiving a control signal from the controller 500. In the case of performing image reconstruction in accordance with an embodiment of the present invention, the display 550 displays picture images for image reconstruction and reconstructed picture images. The image sensor 130 of FIG. 12 performs the same operation as in the image sensor 130 of FIG. 6. The image sensor for use in the mobile phone equipped with a camera generates an electric signal in proportion to the quantity of light illuminated on a light receiving part, and Analog-to-Digital (AD)-converts the electric signal, such that the electric signal is converted into digital data processable by the image processor 100. The image sensor includes a readable/recordable register therein, and is controlled by information recorded in the register. Commercial image sensors each include a register for controlling exposure, such that the image processor 100 can variously control the exposure of the image sensor 130, resulting in acquisition of images having different exposures. Also, there have recently been proposed a variety of manufactured products which are easily programmed by developers and processors for easily controlling cameras or LCDs, etc. The image processor 100 includes the remaining components other than the image sensor 130 and the display 550.

Referring to FIG. 12, the image sensor 130 and the image processor 100 are not operated while the mobile phone is operated. The display 550 displays data generated during the operation time of the mobile phone upon receiving a control signal from the controller 500.

If the entry unit 530 outputs an image reconstruction command when the mobile phone is in standby mode, the controller 500 controls the image processor 100 such that it performs operations of image reconstruction. In this case, an image reconstruction mode can be classified into first to third modes. The first mode captures a picture image of a target object in the form of a still image, and performs image reconstruction. The second mode captures a picture image of the target object in the form of a moving image, and performs image reconstruction using the timing diagram of FIG. 11. The third mode selects two or more picture images captured at different exposures from the memory 540, and performs image reconstruction. In this case, upon receiving the image reconstruction request from the user, the controller 500 can display the aforementioned first to third image reconstruction methods on the display 550 in the form of a menu. Therefore, the aforementioned image reconstruction method may be displayed in the form of a menu, and a user of the mobile phone can select a corresponding image reconstruction method from the menu.

Provided that the image processor 100 performs only an image processing function and does not include a processor for controlling a program, the image reconstruction procedure can be performed by the controller 530. Specifically, in the case of the terminal device having the controller 500, the image processor 100 includes both an image processing function for displaying image data generated from the image sensor 130 on the display 550 and an exposure control function for controlling exposure of the image sensor 130. The procedure for calculating local variance values for image reconstruction and the other procedure for performing image reconstruction may be processed by the controller 500. For the convenience of description, it is assumed that the image processor 100 performs the image reconstruction procedure.

If the first image reconstruction method is selected, the controller 500 informs the image processor of the selected method, and activates a data path between the image processor 100 and the display 550. The image processor 100 can display image data processed by the procedure of FIG. 8 on the display 550. In this case, the procedure of FIG. 8 may be processed by the image processor 100. The image processor 100 takes full charge of the image data processing, and the control procedure of FIG. 8 may be processed by the controller 500. In this case, the image processor 500 controls the image sensor 130 such that the image sensor 130 can capture two or more picture images having different exposures. The picture images captured by the image sensor 130 are displayed on the display 550. Thereafter, the local variance values are sequentially calculated, and the calculated local variance values are compared with each other. The local image having a high local variance value is assigned a higher weight, the other local image having a low local variance value is assigned a lower weight, and the above local images are synthesized with each other, such that an image can be reconstructed.

In this case, in the case of reconstructing an image without pre-processing the captured picture images, local variance values of two picture images are compared with each other at a specific time at which the second picture image is acquired in such a way that an image can be reconstructed in real time.

If the second image reconstruction method is selected, the controller 500 informs the image processor 100 of the selected method, and activates a data path between the image processor 100 and the display 550. The exposure control signal shown in FIG. 11 is transmitted to the image sensor 130. The image processor 100 processes image data captured by the image sensor at different exposures in frame units, and outputs the processed result on the display 550. The display 550 displays the received images in the form of a preview screen. In this case, the image processor 100 can reconstruct one image by adapting a time of two frames as a period, and can successively reconstruct two-frame image data. The method for reconstructing one image by adapting the two-frame time as one period captures first and second frame images having different exposures, and reconstructs the first and second frame images. If the image processor 100 controls exposure of the image sensor 130 according to the timing diagram of FIG. 11, an odd-numbered image and an even-numbered image (i.e., first and second images, third and fourth images, or fifth and sixth images, . . . ) can be reconstructed as one image. The method for successively reconstructing two frame image data captures successive frame images having different exposures, and reconstructs a current entry frame image and a previous frame image. Therefore, if the image processor 100 controls the exposure of the image sensor 130 according to the timing diagram of FIG. 11, the previous frame image and the current entry frame image (i.e., first and second images, third and fourth images, or fifth and sixth images, . . . ) can be reconstructed as one image.

If the third image reconstruction method is selected, the controller 500 displays a menu for requiring picture image selection for image reconstruction on the display 500. In this case, if a user selects picture images for image reconstruction, the controller 500 recognizes the selected picture images, and controls the image processor 100 to perform the image reconstruction procedure. In this case, the selected picture images are indicative of picture images having different exposures. The image processor 100 sequentially calculates the local variance values of the selected picture images, and compares the calculated local variance values therebetween. Therefore, a higher weight is applied to a first local image having a higher local variance, a lower weight is applied to a second local image having a lower local variance, and the first local image is synthesized with the second local image, resulting in image reconstruction.

The aforementioned image reconstruction procedure may also be processed by the controller 500. In this case, the image processor 100 controls the image sensor 130 according to the selected image reconstruction method, and performs an acquisition operation of picture images having different exposures and an image data processing operation for displaying the acquired image data on the display 550. The controller 500 sequentially calculates local variance values of the acquired picture images, compares the calculated local variance values therebetween, assigns a higher weight to a local image having a high local variance value, assigns a lower weight to a local image having a low local variance value, and synthesizes the local images using the higher and lower weights, resulting in image reconstruction.

The present invention reconstructs an image in real time using two or more still images captured at different exposures or moving images successively captured at different exposures, and gains access to the stored two or more picture images having different exposures, such that it can reconstruct a desired image. Although the aforementioned image reconstruction methods are adapted to the mobile phone, it should be noted that they are applicable to a variety of terminal devices, for example, digital cameras, and computers, etc.

As apparent from the above description, the embodiments of the present invention capture at least two picture images having different illumination degrees during an image-capturing mode, such that they acquire a high-quality image in which a target object image and a background image each have a high resolution. The embodiments of the present invention calculate local variance values of the acquired images, compare the calculated variance values, assign a high weight to a local image having a high local variance value, assign a low weight to a local image having a low local variance value, and synthesize the two local images with each other, such that they can reconstruct an image. Therefore, individual qualifies of the target object image and the background image in the reconstructed image are improved, resulting in reproduction of a clear image.

Although certain embodiments of the present invention have been disclosed for illustrative purposes, those skilled in the art should appreciate that various modifications, additions and substitutions are possible, without departing from the scope and spirit of the invention as disclosed in the accompanying claims.

What is claimed is:

1. An apparatus equipped with a camera, comprising:
an image sensor for acquiring substantially identical images having different illumination degrees;
a plurality of memories for storing the substantially identical images generated from the image sensor;
an image controller for dividing each of the substantially identical images into a plurality of local images each having a predetermined size of at least larger than 1 pixel by 1 pixel, calculating a local variance value for each of the local images, the local variance value of a local image being derived from deviations of image data of image pixels of the local image from a mean value of the image data of the local image, comparing the calculated local variance values therebetween, assigning a high weight to a local image of one of the substantially identical images having a high variance value, assigning a low weight to a corresponding local image of another one of the substantially identical images having a low variance value, synthesizing the corresponding local images, and creating a reconstructed image; and
a display for displaying the reconstructed image.

2. The apparatus according to claim 1, further comprising:
a timing controller for generating an exposure control signal to control an exposure time of the image sensor, in which the timing controller generates at least two timing control signals for providing the image sensor with different exposure times upon receiving a control signal from the image controller.

3. The apparatus according to claim 2, wherein the image controller includes:
a local area allocator for determining local images of each of the substantially identical images;
an average value calculator for calculating the mean value of image data of a determined local image;
a variance value calculator for calculating the local variance value of a determined local image using the mean value of the image data;
a comparator for comparing the calculated local variance values;
a weight calculator for assigning a high weight to a local image of one of the substantially identical images having a high variance value, and assigning a low weight to a corresponding local image of another one of the substantially identical images having a low variance value according to the result of the comparison; and
an image reconstruction unit for synthesizing the corresponding local images using the determined weights, and performing image reconstruction.

4. The apparatus according to claim 3, wherein the image controller further includes:
a pre-processor for tracking motion vectors of the captured images, and controlling pixel positions of the images to be equal to each other.

5. The apparatus according to claim 3, wherein the mean value calculator calculates a mean value of image data using the following equation:

$$M(i, j) = \frac{\sum_{r=-1}^{1}\sum_{s=-1}^{1} I(i+r, j+s)}{9}$$

the variance value calculator calculates a variance value of the local image data using the following equation:

$$\mathrm{Var}(I(i, j)) = \frac{\sum_{r=-1}^{1}\sum_{s=-1}^{1} [I(i+r, j+s) - M(i, j)]^2}{9}$$

where 'i' is an X-axis coordinate, 'j' is a Y-axis coordinate, 'r' is a displacement of the X-axis coordinate in the 3×3 area, 's' is a displacement of the Y-axis coordinate in the 3×3 area, I(i,j) is a pixel value of an image at a coordinate (i,j), M(i,j) is a mean value of pixel values in the 3×3 area centering around the coordinate (i,j), and Var(I(i,j)) is variance of pixel values in the 3×3 area centering around the coordinate (i,j), the weight calculator calculates weights using the following equations:

$$W_S(i, j) = \frac{\sigma_S^2(i, j) + 1}{[\sigma_S^2(i, j) + 1] + [\sigma_L^2(i, j) + 1]}$$

$$W_L(i, j) = \frac{\sigma_L^2(i, j) + 1}{[\sigma_S^2(i, j) + 1] + [\sigma_L^2(i, j) + 1]}, \text{ and}$$

the image reconstruction unit performs image reconstruction using the following equation:

$$R(i,j) = W_S(i,j) \times I_S(i,j) + W_L(i,j) \times I_L(i,j)$$

6. The apparatus according to claim 3, wherein the weights satisfy the following equation:

$$W_S(i,j) + W_L(i,j) = 1$$

7. An image processing apparatus for use in a mobile phone or hand-held phone, comprising:
a communication module for performing a wireless communication function;
a data processor for performing modulation/demodulation and coding/decoding functions of a signal transmitted/received by the communication module;
a controller for processing the signal transmitted/received by the data processor in a communication mode, and generating an image-processing control signal in an image processing mode;
a timing controller for generating at least two exposure control signals having different exposure times in the image processing mode;
an image sensor for acquiring substantially identical images having different illumination degrees using the exposure control signals;
an image processor for dividing each of the substantially identical images acquired from the image sensor into a plurality of local images each having a predetermined size of at least larger than 1 pixel by 1 pixel, calculating a local variance value for each of the local images, the local variance value of a local image being derived from deviations of image data of image pixels of the local image from a mean value of the image data of the local image, comparing the calculated local variance values therebetween, assigning a high weight to a local image of one of the substantially identical images having a high variance value, assigning a low weight to a corresponding local image of another one of substantially identical images having a low variance value, synthesizing the corresponding local images, and creating a reconstructed image;

a plurality of memories for storing the images generated from the image sensor, and storing an image reconstructed by the image processor; and a display for displaying the acquired images and the reconstructed image.

8. The apparatus according to claim 7, wherein the image processor includes:

a local area allocator for determining local images of each of the substantially identical images;

an average value calculator for calculating the mean value of image data of a determined local image;

a variance value calculator for calculating the local variance value of a determined local image using the mean value of image data of the determined local image;

a comparator for comparing the calculated local variance values;

a weight calculator for assigning a high weight to a local image of one of the substantially identical images having a high variance value, and assigning a low weight to a corresponding local image of another one of the substantially identical images having a low variance value according to the result of the comparison; and an image reconstruction unit for synthesizing the corresponding local images using the determined weights, and performing image reconstruction.

9. An image reconstruction method for use in an apparatus including a digital camera, comprising the steps of:

acquiring/displaying substantially identical images having different illumination degrees;

dividing each of the acquired substantially identical images into a plurality of local images each having a predetermined size of at least larger than 1 pixel by 1 pixel, and calculating a local variance value for each of the local images, the local variance value of a local image being derived from deviations of image data of image pixels of the local image from a mean value of the image data of the local image;

comparing the calculated local variance values therebetween, assigning a high weight to a local image of one of the substantially identical images having a high local variance value, assigning a low weight to a corresponding local image of another one of the substantially identical images having a low local variance value;

applying the determined weights to image data of the corresponding local images, performing image reconstruction, and displaying a reconstructed image.

10. The method according to claim 9, wherein the step of calculating the local variance values further includes the steps of:

determining local images of each of the substantially identical images;

calculating the mean value of image data of a determined local image; and calculating variance values of the local areas using the mean value of the image data.

11. The method according to claim 10, wherein the step of determining and assigning the weights further includes the steps of:

comparing the calculated local variance values; and assigning a high weight to a local image of one of the substantially identical images having a high variance value, and assigning a low weight to a corresponding local image of another one of the substantially identical images having a low variance value according to the result of the comparison.

12. The method according to claim 11, further comprising the step of:

acquiring different images, tracking motion vectors of the acquired images, and controlling pixel positions of the images to be equal to each other.

13. The method according to claim 10, wherein the mean value is calculated by the following equation:

$$M(i,j) = \frac{\sum_{r=-1}^{1}\sum_{s=-1}^{1} I(i+r, j+s)}{9}$$

the variance value is calculated by the following equation:

$$\mathrm{Var}(I(i,j)) = \frac{\sum_{r=-1}^{1}\sum_{s=-1}^{1} [I(i+r, j+s) - M(i,j)]^2}{9}$$

where 'i' is an X-axis coordinate, 'j' is a Y-axis coordinate, 'r' is a displacement of the X-axis coordinate in the 3×3 area, 's' is a displacement of the Y-axis coordinate in the 3×3 area, I(i,j) is a pixel value of an image at a coordinate (i,j), M(i,j) is a mean value of pixel values in the 3×3 area centering around the coordinate (i,j), and Var(I(i,j)) is variance of pixel values in the 3×3 area centering around the coordinate (i,j), the weights are calculated by the following equations:

$$W_S(i,j) = \frac{\sigma_S^2(i,j)+1}{[\sigma_S^2(i,j)+1]+[\sigma_L^2(i,j)+1]}$$

$$W_L(i,j) = \frac{\sigma_L^2(i,j)+1}{[\sigma_S^2(i,j)+1]+[\sigma_L^2(i,j)+1]}, \text{ and}$$

the image reconstruction is performed by the following equation:

$$R(i,j) = W_S(i,j) \times I_S(i,j) + W_L(i,j) \times I_L(i,j)$$

14. An image reconstruction method for use in an apparatus including a digital camera, comprising the steps of:

driving an image sensor during a short exposure time in an image reconstruction mode to acquire a first frame image, driving the image sensor during a relatively-long exposure time in the image reconstruction mode to acquire a second frame image, said first frame image and said second frame image having different illumination degrees;

assigning the substantially identical image data of the first frame image and the second frame image to local images each having a predetermined size of at least larger than 1 pixel by 1 pixel;

calculating a local variance value of image data of each of the local images, the local variance value of a local image being derived from deviations of image data of image pixels of the local image from a mean value of the image data of the local image;

comparing a local variance value of a local image of the first frame image with a corresponding local variance value of a corresponding local image of the second frame image, assigning a high weight to the one local image having a high local variance value, and assigning a low weight to the other corresponding local image having a low local variance value; and applying the determined weights to image data of individual local areas of the first frame image and the second frame image, performing image reconstruction, and displaying a reconstructed image.

15. A moving image display method for use in an apparatus including a digital camera, comprising the steps of:

driving an image sensor during a first exposure time in an image reconstruction mode to acquire a first image, calculating a first local variance value of the first image, the first local variance value being derived from deviations of image data of image pixels of one local area of the first image from a mean value of the image data of the local area of the first image, said one local area of the first image being at least larger than 1 pixel by 1 pixel. and storing the first local variance value;

driving the image sensor during a second exposure time in the image reconstruction mode to acquire a second image, calculating a second local variance value of the second image, the second local variance value being derived from deviations of image data of image pixels of one local area of the second image from a mean value of the image data of the local area of the second image, said one local area of the second image being at least larger than 1 pixel by 1 pixel, and storing the second local variance value;

comparing the second local variance value of the second image with the first local variance value of the first image, assigning a high weight to the one local area of one image having a high local variance value, and assigning a low weight to the other local area of the other image having a low local variance value; and applying the determined weights to image data of the corresponding local areas of the first image and the second image, performing one image reconstruction, and displaying a reconstructed image.

16. An image reconstruction method for use in an apparatus including a digital camera, comprising the steps of:

controlling a first image and a second image having different illumination degrees to be selected in an image reconstruction mode;

if the first image and the second images are selected, assigning substantially identical image data of the first image and the second image to local images each having a predetermined size of at least larger than 1 pixel by 1 pixel, and calculating a local variance value for each one of the local images, the local areas the local variance value of a local image being derived from deviations of image data of image pixels of the local image from a mean value of the image data of the local image;

comparing the local variance values of the first image and the second image therebetween, assigning a high weight to one local image having a high local variance value, and assigning a low weight to the other corresponding local image having a low local variance value; and applying the determined weights to image data of individual local images of the first image and the second image, performing image reconstruction, and displaying a reconstructed image.

* * * * *